(12) United States Patent
Tezuka

(10) Patent No.: US 6,832,807 B2
(45) Date of Patent: Dec. 21, 2004

(54) VEHICLE OPEN ROOF APPARATUS

(75) Inventor: Naoyuki Tezuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/782,583

(22) Filed: Feb. 19, 2004

(65) Prior Publication Data
US 2004/0164586 A1 Aug. 26, 2004

(30) Foreign Application Priority Data
Feb. 21, 2003 (JP) .................................... 2003-044187

(51) Int. Cl.[7] ............................................. B60J 7/19
(52) U.S. Cl. .................................. 296/128; 296/108
(58) Field of Search ............................ 296/107.01, 108, 296/116, 107.08, 107.17, 120.1, 124, 128

(56) References Cited

U.S. PATENT DOCUMENTS

| | | | | |
|---|---|---|---|---|
| 4,805,956 A | * | 2/1989 | Saunders | ............... 296/107.17 |
| 4,948,194 A | * | 8/1990 | Dogliani | ................... 296/120.1 |
| 5,533,777 A | * | 7/1996 | Kleemann et al. | ...... 296/107.08 |
| 6,033,008 A | * | 3/2000 | Mattila | ................... 296/107.17 |
| 6,595,574 B2 | * | 7/2003 | Shaw et al. | ............... 296/120.1 |

FOREIGN PATENT DOCUMENTS

| | | |
|---|---|---|
| JP | 5-44642 | 6/1993 |
| JP | 7-232561 | 9/1995 |

* cited by examiner

*Primary Examiner*—Jason Morrow
(74) *Attorney, Agent, or Firm*—Merchant & Gould P.C.

(57) ABSTRACT

An open roof apparatus includes a link lock mechanism for fastening a swinging distal end portion of a link mechanism to a rear portion of a vehicle body when a roof is moved into a stored position. When the roof is moved into the stored position, the link mechanism supports the vehicle body between a portion to which a swinging proximal portion of the link mechanism is mounted and the rear portion of the vehicle body to which the swinging distal end portion is fastened.

1 Claim, 13 Drawing Sheets

VEHICLE OPEN ROOF APPARATUS

FIELD OF THE INVENTION

The present invention relates to an open roof apparatus mounted to a vehicle body to permit a roof covering the top of a passenger compartment to move between an extended position in which it extends over the vehicle top and a stored position in which it is stored in a vehicle rear portion.

BACKGROUND OF THE INVENTION

This kind of open roof apparatus is disclosed, for example, in Japanese Patent Laid-Open Publication No. HEI-7-232561 or Japanese Utility Model Laid-Open Publication No. HEI-5-44642.

An open roof apparatus of HEI-7-232561 has a structure in which a roof covering the top of a passenger compartment is mounted to a vehicle body via a link mechanism so as to be movable between an extended position in which it extends over the top of the vehicle and a stored position in which it is stored in a storage compartment at a vehicle rear portion.

An open roof apparatus of HEI-5-44642 has a structure in which a hood-shaped roof covering the top of a passenger compartment is folded and stored in a storage provided at the rear of the passenger compartment.

FIG. 16 illustrates the open roof apparatus presented in HEI-7-232561.

Referring to FIG. 16, a vehicle 200 has a front hard roof 202 and a rear hard roof 203 which cover the top of a passenger compartment 201.

When a gear 204 is rotated clockwise by a motor not shown, a drive link 205 moves upward, tracing an arc path. A roof set bracket 208 coupled to a distal end portion of the drive link 205 is rotated clockwise about a fulcrum 207. The rear hard roof 203 is swung clockwise and stored in a storage compartment 209 formed at the rear of the vehicle 200.

At the same time, a cam 212 supported on a fulcrum 211 relative to the vehicle body 206 is driven by the roof set bracket 208 to rotate counterclockwise about the fulcrum 211. As a result, a first link 213 is swung clockwise, causing the front hard roof 202 to swing clockwise via a bell crank 214, a second link 215 and an arm member 216, to be stored in the storage compartment 209.

In a stored state, the first link 213, bell crank 214, second link 215 and arm member 216 are also stored in the storage compartment 209. As a result, the vehicle 200 can be used as an open car.

Thereafter, the motor can be reversed to return the front and rear hard roofs 202, 203 from the storage compartment 209 to their original states.

Meanwhile, in the vehicle 200 running, a bending moment or a twisting moment is produced. For example, during running, road reaction forces act on a front portion 223 and a rear portion 224 of the vehicle body 206 via front wheels 221 and rear wheels 222, thus inducing a vertical bending moment or twisting moment in the vehicle body 206. Against such moment, the vehicle body 206 needs to have sufficient rigidity.

In particular, when the vehicle 200 is used as an open car, the front and rear hard roofs 202, 203 are stored in the storage compartment 209, so that the front and rear hard roofs 202, 203 cannot support the top of the vehicle body 206. Accordingly, the rigidity of the vehicle body 206 should be increased. To ensure a rigidity balance throughout the vehicle body 206, it is also necessary to ensure sufficient rigidity at the rear portion 224. For this, the rear portion 224 is partially reinforced by a number of reinforcing members at portions where it is desirable to increase rigidity. The addition of the reinforcing members, however, leads to an increase in vehicle weight, preventing weight reduction of the vehicle body 206, and thus leaving room for improvement.

The same is true for the open roof apparatus of HEI-5-44642.

It is thus required to ensure rigidity at a rear portion of a vehicle body while avoiding weight increase of the vehicle body of a vehicle having a roof covering the top of a passenger compartment which is movable between an extended position in which it extends over the vehicle top and a stored position in which it is stored in a vehicle rear portion.

SUMMARY OF THE INVENTION

According to the present invention, there is provided a vehicle open roof apparatus which permits a roof covering a top of a passenger compartment to be stored in a storage compartment at a vehicle rear portion, which open roof apparatus comprises: at least one link mechanism swingably mounted to a vehicle body of the vehicle to permit the roof to move between an extended position in which the roof is extended over the top of the vehicle and a stored position in which the roof is stored in the storage compartment; and at least one link lock mechanism for fastening a swinging distal end portion of the link mechanism to a rear end portion of the vehicle body when the roof is moved into the stored position.

As just described, the open roof apparatus in this invention has the link lock mechanism for fastening the swinging distal end portion of the link mechanism to the rear end portion of the vehicle body when the roof is moved into the stored position, so that the vehicle body can be supported by the link mechanism between a portion thereof to which a swinging proximal portion of the link mechanism is mounted and the rear end portion to which the swinging distal end portion is fastened when the roof is moved into the stored position. This results in an increase in longitudinal rigidity of the vehicle rear portion. The securement of rigidity of the vehicle rear portion while preventing weight increase of the vehicle body can ensure a sufficient rigidity balance throughout the vehicle body.

The link mechanism and the link lock mechanism in this invention are preferably provided at either side of the vehicle body. Thus, the vehicle rear portion is supported at its both sides by the left and right link mechanisms. The longitudinal rigidity of the vehicle rear portion can thus be further increased to ensure a more sufficient rigidity balance throughout the vehicle body.

The link lock mechanism in this invention preferably comprises a striker provided at the swinging distal end portion of the link mechanism and a latch mechanism provided at the rear end portion of the vehicle body for locking and unlocking the striker, thus having a simple structure.

Further, the link lock mechanism in this invention preferably has an auxiliary lock mechanism, which auxiliary lock mechanism comprises a vertically elongated lock pin provided at the rear end portion of the vehicle body or the swinging distal end portion of the link mechanism, and a lock hole provided in the swinging distal end portion of the link mechanism or the rear end portion of the vehicle body, into which hole the lock pin is vertically fitted. The lock pin and the lock hole prevent rattling of the vehicle rear portion in all horizontal directions. Thus, the longitudinal and lateral rigidity of the vehicle rear portion can be further increased to ensure a more sufficient rigidity balance throughout the vehicle body.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

In the accompanying drawings, a vehicle 10 is viewed from the left side, and only left members of both side members are shown.

Figure 1:
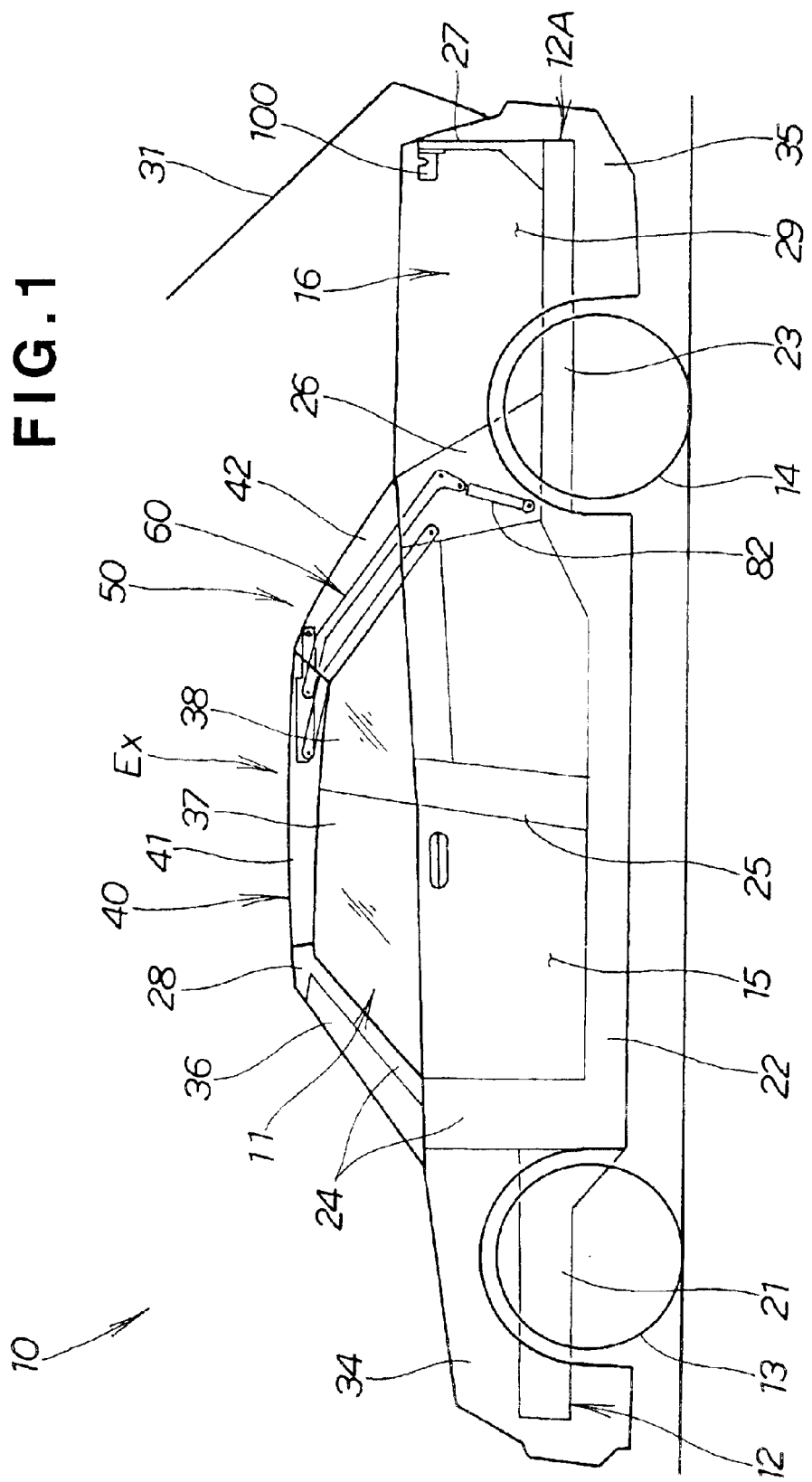
FIG. 1 is a schematic side view of a vehicle with an open roof apparatus according to the present invention.

The vehicle 10 shown in FIG. 1 covered by a roof 40 at the top of a passenger compartment 11 has a vehicle body 12 and left and right front wheels 13, left and right rear wheels 14, left and right doors 15 and a storage compartment 16 which are provided at the vehicle body.

The vehicle body (vehicle frame) 12 is a monocoque body including left and right front side frames 21 at the vehicle front, left and right side sills 22 at the vehicle longitudinal center, left and right rear side frames 23 at the vehicle rear, and crossmembers (not shown) extended transversely between these members.

The vehicle body 12 further includes left and right front pillars 24 extending upward from rear end portions of the left and right front side frames 21, left and right center pillars 25 extending upward from longitudinally middle portions of the left and right side sills 22, left and right rear pillars 26 extending upward from front end portions of the left and right rear side frames 23, a rear end panel 27 extending upward from rear end portions of the left and right rear side frames 23, and a roof front rail 28 extended between the upper ends of the left and right front pillars 24.

The roof 40 is a two-part split roof consisting of a front roof 41 at the front extending rearward from a rear edge portion of the roof front rail 28, and a rear roof 42 extending from the rear edge of the front roof 41 to the upper ends of the left and right rear pillars 26.

The front roof 41 is a roof half detachably attached to the rear edge portion of the roof front rail 28.

The rear roof 42 is a roof half separated from the front roof 41 and the left and right rear pillars 26.

The front and rear roofs 41, 42 constitute an opening and closing roof, a so-called open roof, made from a metal material such as steel for ensuring rigidity.

The storage compartment 16 at the rear of the vehicle 10 is a trunk room opening upward, defined by the left and right rear side frames 23, the left and right rear pillars 26, the rear end panel 27 and left and right rear side panels 29. The upper opening can be closed by a trunk lid 31. The trunk lid 31 is openably and closably attached at its proximal edge portion to the rear end panel 27.

In the figure, reference numeral 34 denotes a front fender, 35 a rear fender, 36 a windshield, 37 a door glass, and 38 a side glass.

Figure 2:
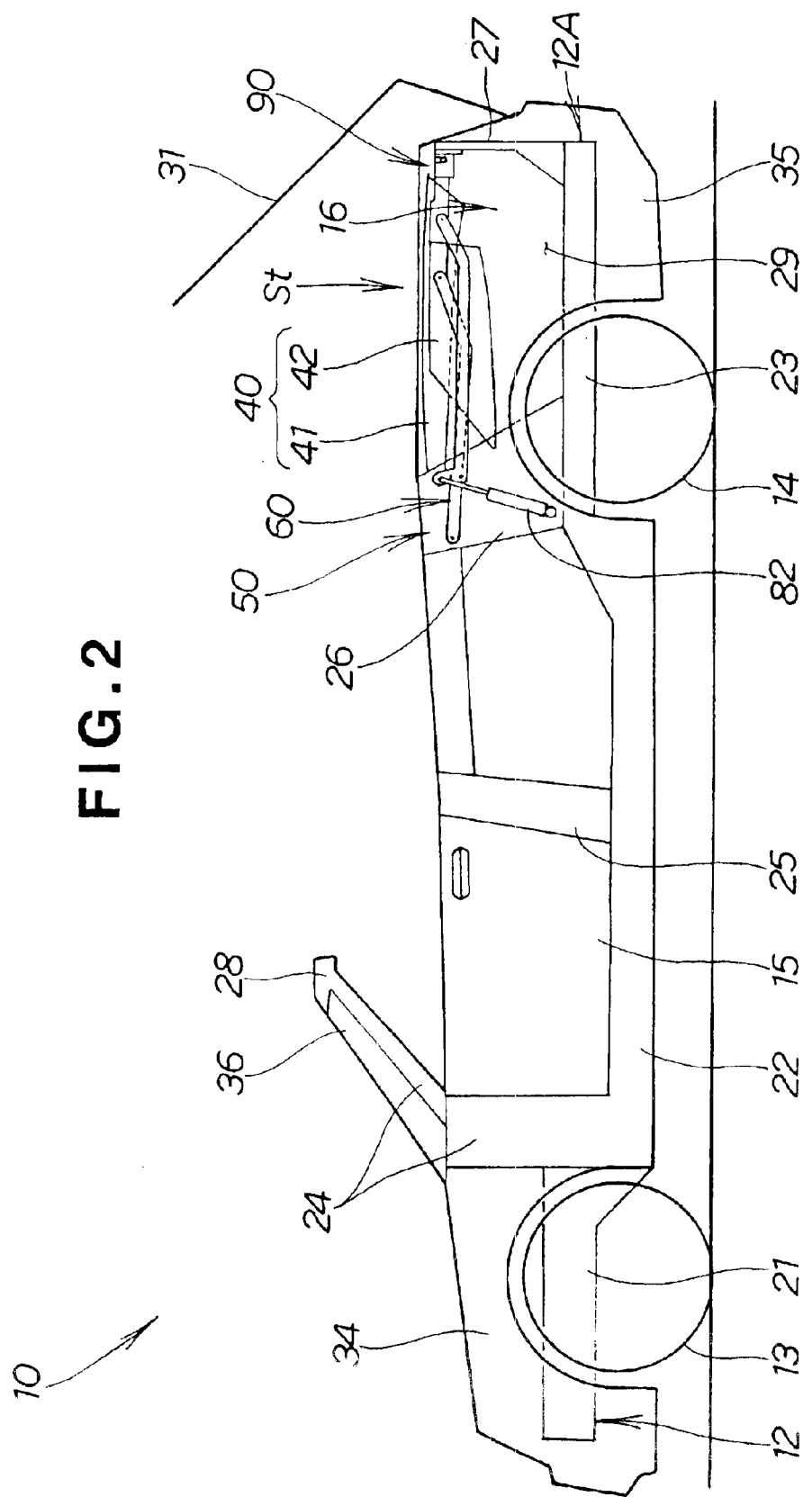
FIG. 2 is a side view of the vehicle shown in FIG. 1 with a roof stored.

FIG. 2 illustrates that the roof 40 is stored in the storage compartment 16.

The vehicle 10 has an open roof storage mechanism 50 in which the roof 40 is mounted to the vehicle body 12 via a link mechanism 60 so as to be movable between an extended position Ex in which it is extended over the top of the vehicle 10 as shown in FIG. 1 and a stored position St in which it is stored in the storage compartment 16 at the rear of the vehicle 10.

The open roof storage mechanism 50 will hereinafter be described in detail.

Figure 3:
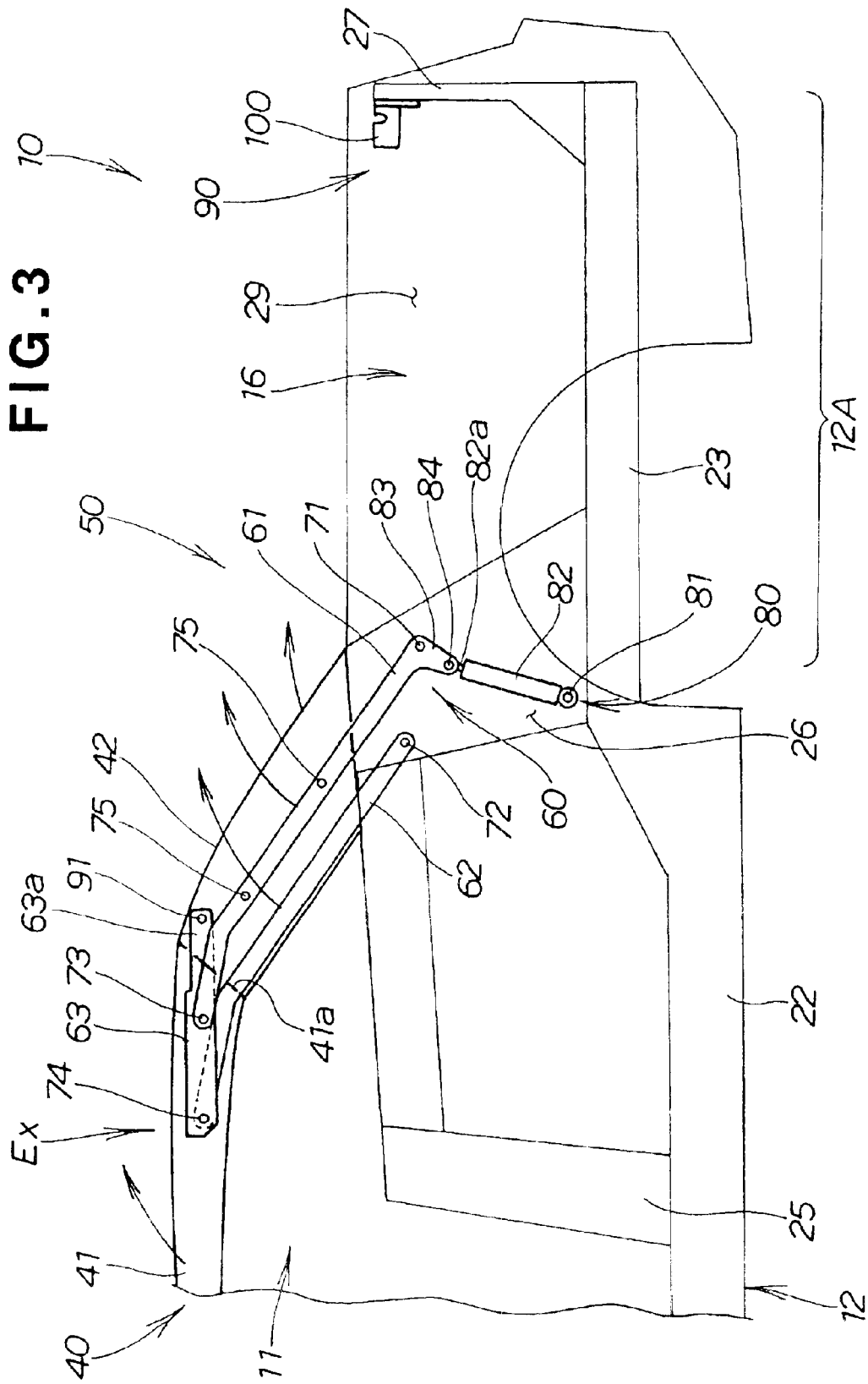
FIG. 3 is a view illustrating an open roof storage mechanism according to the present invention.

As shown in FIG. 3, the open roof storage mechanism 50 has the link mechanism 60, a drive mechanism 80 for swingingly driving the link mechanism 60, and a link lock mechanism 90 for fastening a swinging distal end portion 63a of the link mechanism 60 to a rear end portion of the vehicle body 12 when the roof 40 is moved into the stored position.

The link mechanism 60 is a four-joint link including the rear pillar 26, a first link 61, a second link 62, a third link 63, and four connecting pins 71, 72, 73 and 74, formed substantially in a parallelogram in a side view of the vehicle 10.

The rear pillar 26 also serves as a link (fourth link) of the link mechanism 60. The third link 63 extends longitudinally substantially horizontally.

The first link 61 is mounted at its lower end portion to an upper rear portion of the rear pillar 26 with the first connecting pin 71, longitudinally swingable about the first connecting pin 71.

The second link 62 is mounted at its lower end portion to an upper front portion of the rear pillar 26 with the second connecting pin 72, longitudinally swingable about the second connecting pin 72.

The first link 61 and the second link 62 located in front of the first link 61 extend in a forward and upward direction, substantially in parallel with one another.

The third link 63 is pivotably supported at its longitudinally middle portion (longitudinally middle position) on an upper end portion of the first link 61 with the third connecting pin 73. The third link 63 is further mounted at its front end portion to an upper end portion of the second link 62 with the fourth connecting pin 74 in a longitudinally swingable manner.

A rear portion of the front roof 41 is attached to the third link 63, so that the front roof 41 is longitudinally movable in accordance with a displacement of the link mechanism 60.

The rear roof 42 is attached to the first link 61 with two fastening pins 75, 75, so that the rear roof 42 is also longitudinally swingable with the first link 61.

A rear end portion 63a of the third link 63 extends farther rearward than the rear edge of the front roof 41. The reason for the rearward extension will be described below.

The drive mechanism 80 has a cylinder 82 longitudinally swingably supported at its one end on a supporting pin 81 relative to a lower portion of the rear pillar 26 and longitudinally swingably connected at the other end with a connecting pin 84 to a distal end portion of an arm 83 extended from the lower end of the first link 61 in a forward and downward direction. The cylinder 82 is a drive source such as an electric cylinder or a hydraulic cylinder. In place of the cylinder 82, an electric motor may be used as a drive source.

Figure 4:
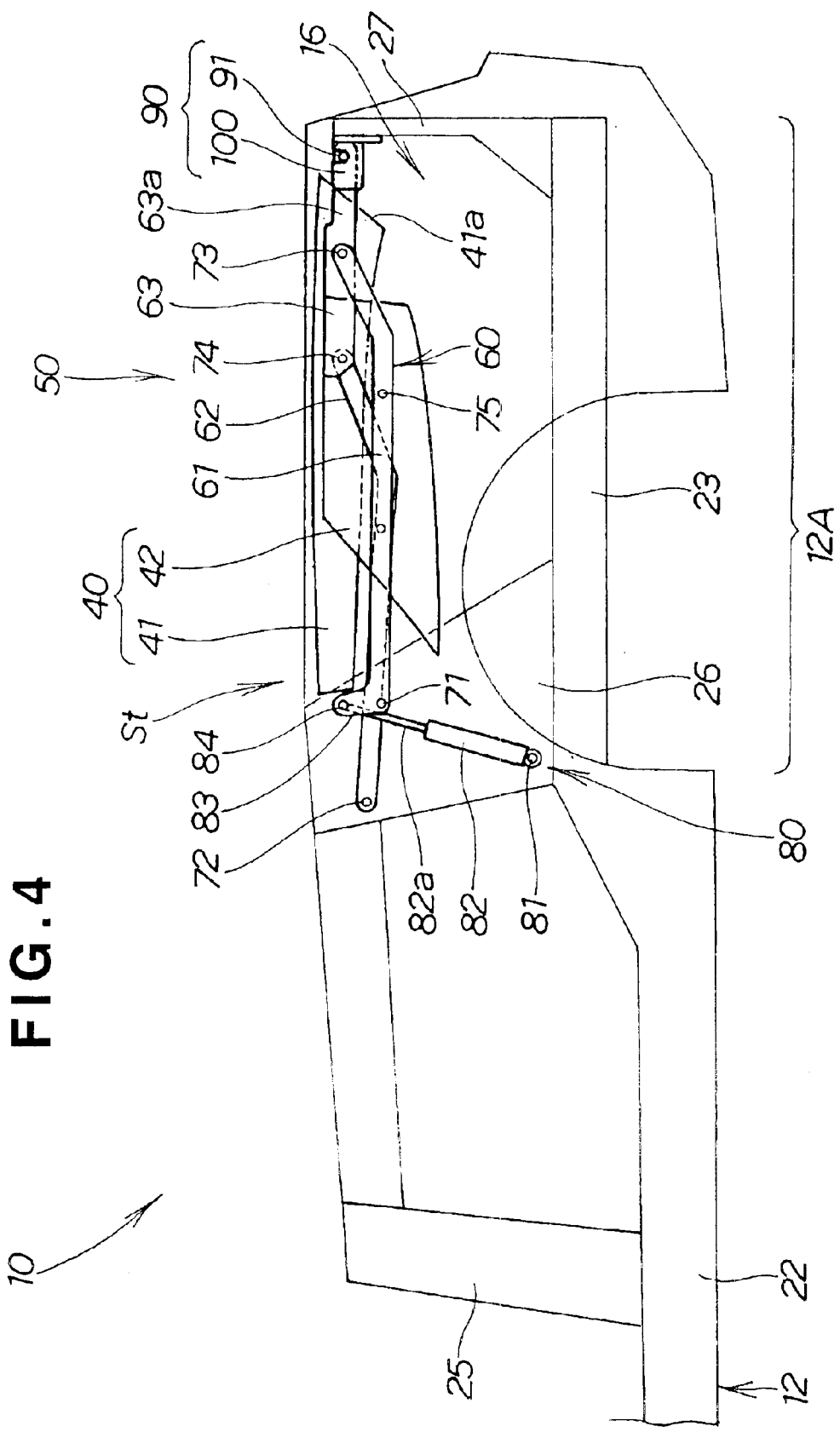
FIG. 4 is a view illustrating the open roof storage mechanism shown in FIG. 3 with the roof stored in a storage compartment.

The roof 40 is stored in the storage compartment 16 at the rear of the vehicle 10 as shown in FIG. 4.

Figure 5:
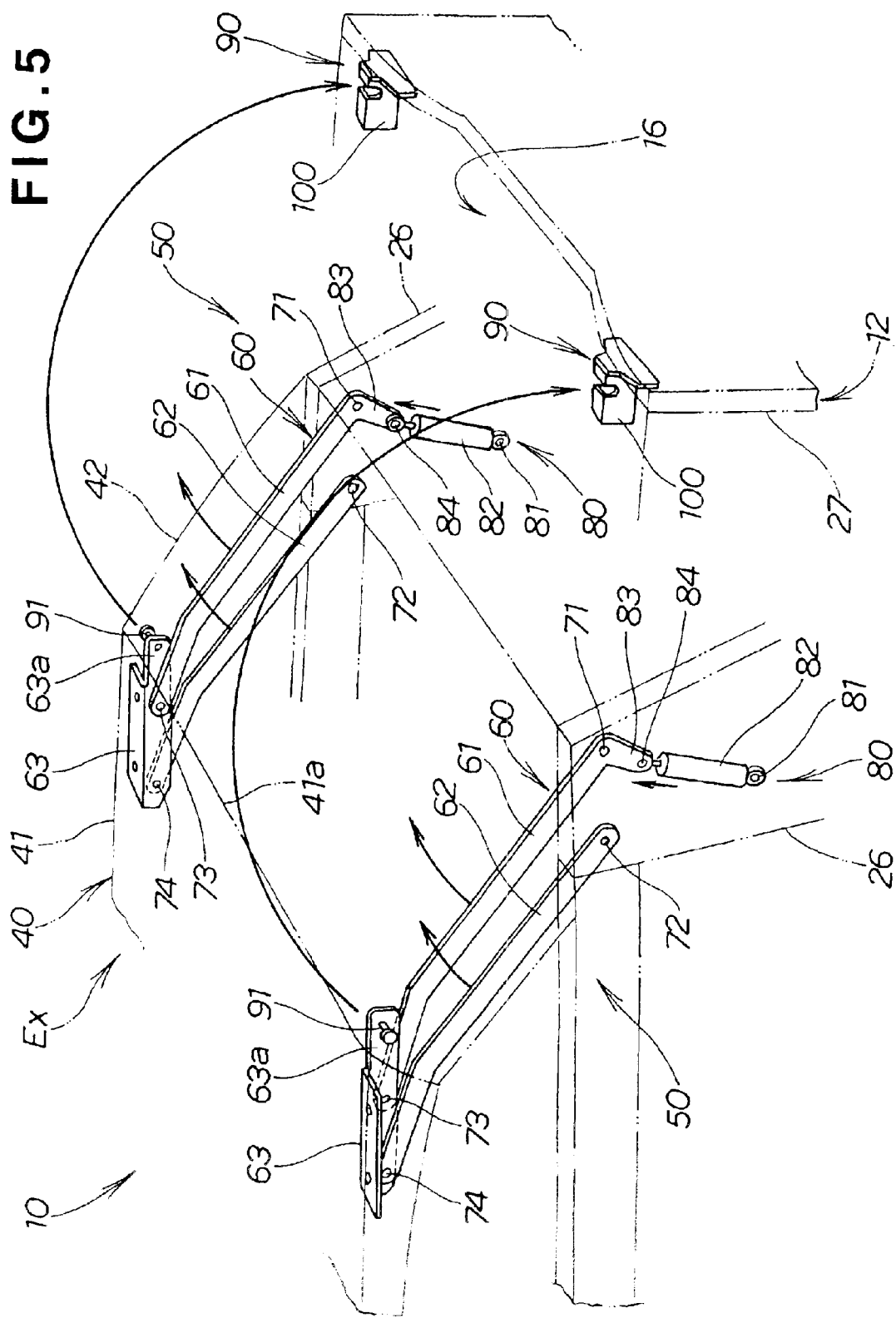
FIG. 5 is a perspective view of the open roof storage mechanism shown in FIG. 3.

As shown in FIG. 5, the left and right open roof storage mechanisms 50, 50 include the left and right link mechanisms 60, 60, left and right drive mechanisms 80, 80 and left and right link lock mechanisms 90, 90.

The left and right link mechanisms 60, 60, drive mechanisms 80, 80 and link lock mechanisms 90, 90 are mounted to a left rear portion of the vehicle body 12 shown in imaginary lines and a left side portion of the roof 40 shown in imaginary lines, and a right rear portion of the vehicle body 12 and a right side portion of the roof 40, respectively.

Figure 6:
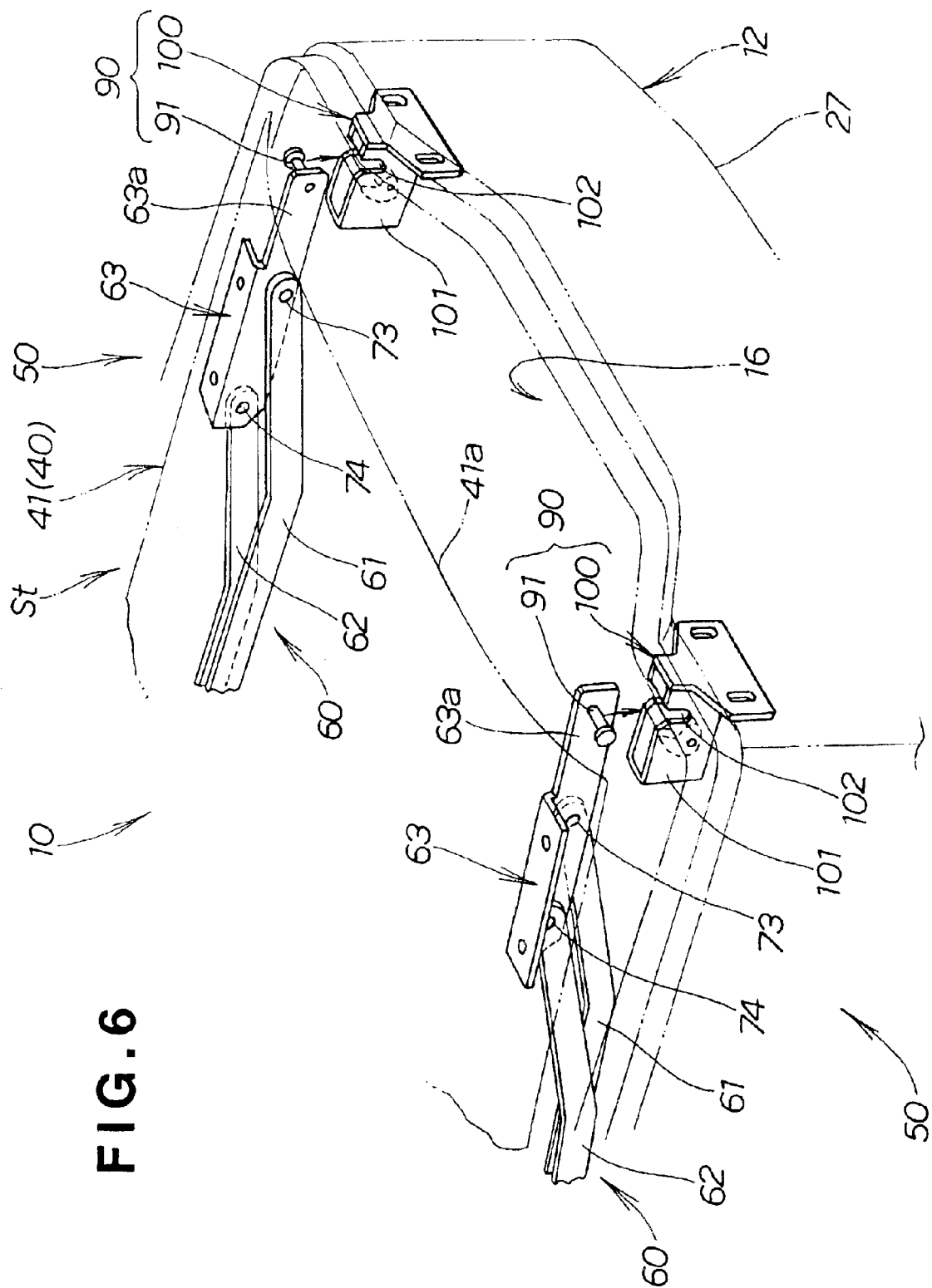
FIG. 6 is a perspective view illustrating a link lock mechanism in the open roof storage mechanism with the roof stored.

FIG. 6 illustrates the states of the left and right link lock mechanisms 90, 90 immediately before the completion of storage of the roof 40 shown in imaginary lines in the storage compartment 16.

The left link lock mechanism 90 includes a striker 91 provided at the swinging distal end portion 63a of the left link mechanism 60 and a latch mechanism 100 provided at a left rear end portion of the vehicle body 12 for locking and unlocking the striker 91.

The rear end portion 63a of the third link 63 extends rearward, protruding from a rear edge 41a of the front roof 41. The extending rear end portion 63a constitutes a swinging distal end portion of the link mechanism 60. The striker 91 is integrally provided at the swinging distal end portion 63a. The striker 91 is a round-bar-shaped pin extending transversely horizontally from the swinging distal end portion 63a.

The latch mechanism 100 has a latch case 101 mounted by bolting to the rear end panel 27 which constitutes the rear end portion of the vehicle body 12.

The latch case 100 is formed with a vertically elongated fitting groove 102 extending transversely therethrough, opening upward, thereby to allow the horizontal striker 91 to be removably fitted into the fitting groove 102 from above.

The right link lock mechanism 90 is symmetrical with the above-described left link lock mechanism 90 and otherwise has the same structure.

Figure 7:
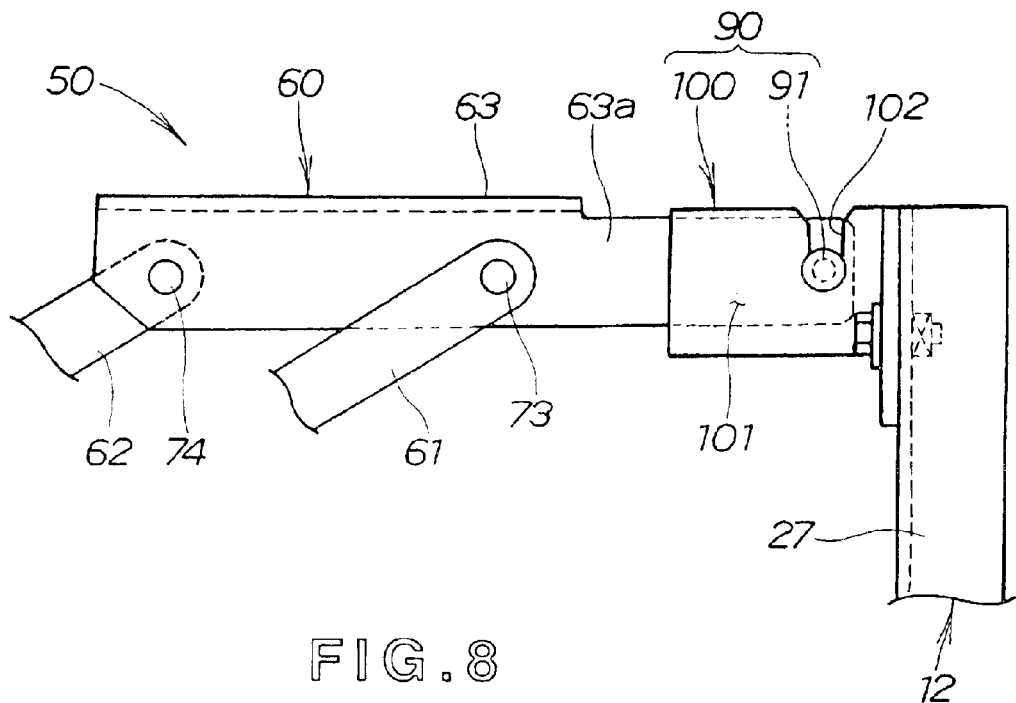
FIG. 7 is a side view of the link lock mechanism with the roof stored.

FIG. 7 is a left side view of the link lock mechanism 90 according to the present invention, illustrating that the striker 91 is fitted into the fitting groove 102 of the latch case 101, and the striker 91 is fastened to the latch mechanism 100, whereby the swinging distal end portion 63a of the link mechanism 60 is fastened to the rear end panel 27 which constitutes the rear end portion of the vehicle body 12.

The fitting groove 102 has a width slightly greater than the diameter of the striker 91.

Reference now returns to FIG. 4 for description. The locations of the first, second, third and fourth pins 71 to 74 and the striker 91 are arranged such that they are longitudinally aligned in a substantially straight line when the roof 40 is stored in the storage compartment 16. FIG. 4 illustrates that the first, second and third links 61 to 63 are also aligned in the substantially straight line, extending longitudinally.

Figure 8:
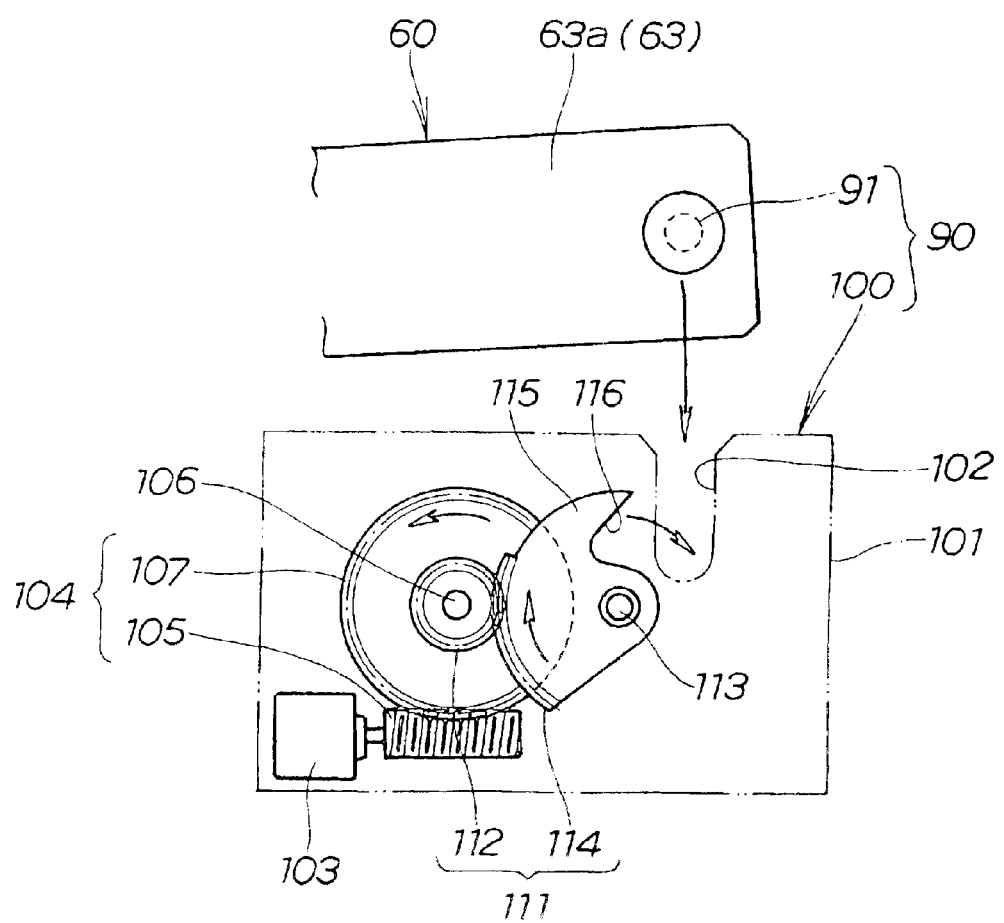
FIGS. 8 and 9 are diagrams illustrating the operation of the link lock mechanism.

FIG. 8 is a schematic structural diagram of the link lock mechanism 90 according to the present invention. The latch mechanism 100 is an electric latch which drives a latch 115 open or closed by an electric motor 103. More specifically, the latch mechanism 100 has the latch 115 connected to the electric motor 103 via a worm gear mechanism 104 and a gear set 111, which members are stored in the latch case 101 shown in imaginary lines.

The worm gear mechanism 104 has a combined structure of a worm 105 mounted on an output shaft of the electric motor 103 and a worm wheel 107 mounted on an intermediate shaft 106. The gear set 111 has a combined structure of a pinion 112 mounted on the intermediate shaft 106 and a sector gear 114 rotatably mounted on a support shaft 113. The latch 115 integrally provided to the sector gear 114 has a claw 116 for locking and unlocking the striker 91.

Now, the operation of the link lock mechanism 90 of the above structure will be described with reference to FIGS. 8 and 9. FIG. 8 illustrates the link lock mechanism 90 in an unlocking state. The claw 116 of the latch 115 is out of the fitting groove 102.

To lock the link lock mechanism 90, first, the striker 91 is fitted into the fitting groove 102 from above, and then the sector gear 114 is forwardly rotated by the electric motor 103 to move the claw 116 of the latch 115 into the fitting groove 102 for engagement with the striker 91. The result is shown in FIG. 9.

Figure 9:
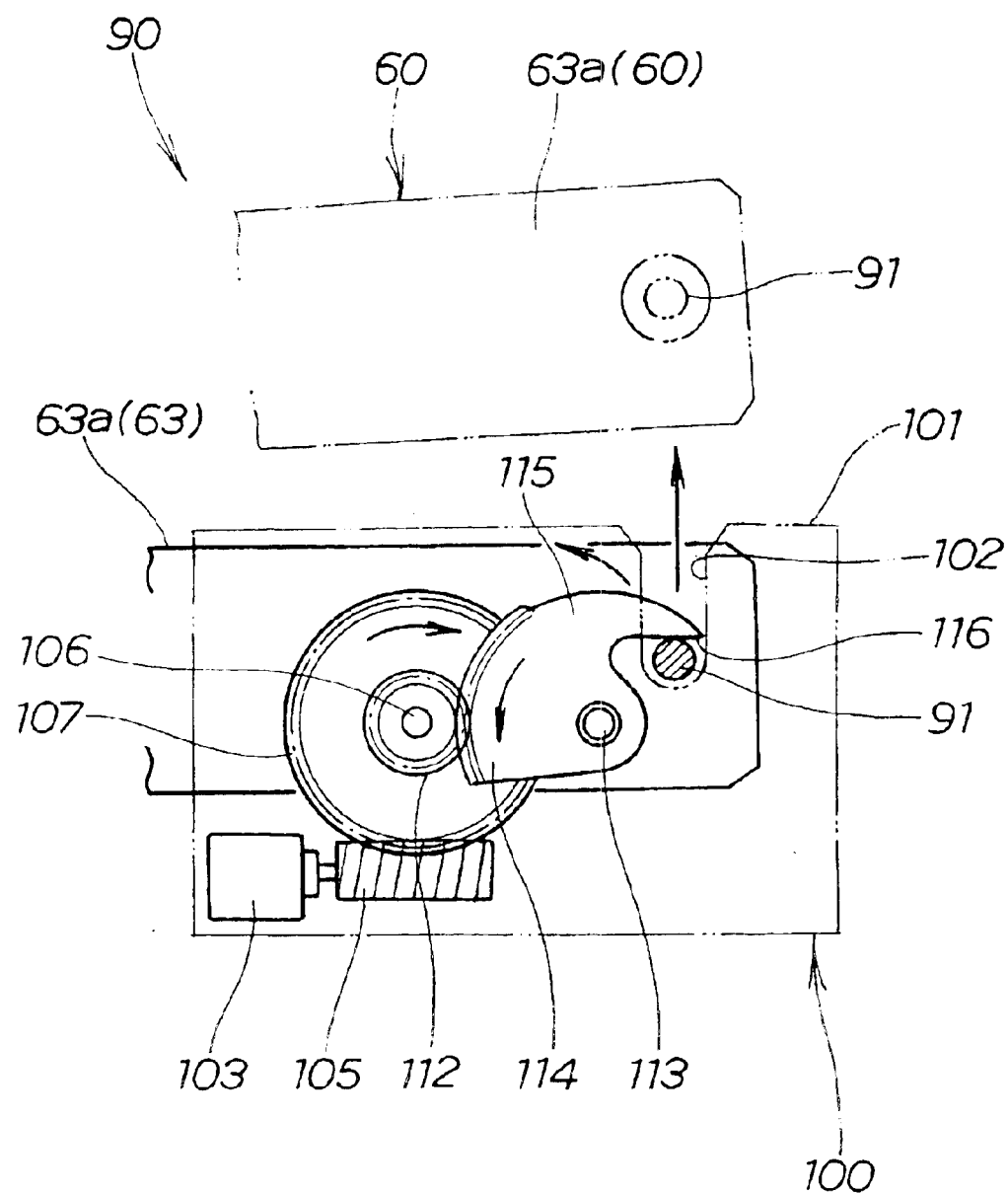

FIG. 9 illustrates that the latch 115 engages and retains the striker 91, thereby locking the link lock mechanism 90.

To unlock the link lock mechanism 90 from this state, the sector gear 114 is reversely rotated by the electric motor 103 to retract the claw 116 of the latch 115 from the fitting groove 102. As a result, the latch 115 is disengaged from the striker 91 to be in the unlocked state shown in FIG. 8. Then, the striker 91 is pulled out upward from the fitting groove 102.

Figure 10:
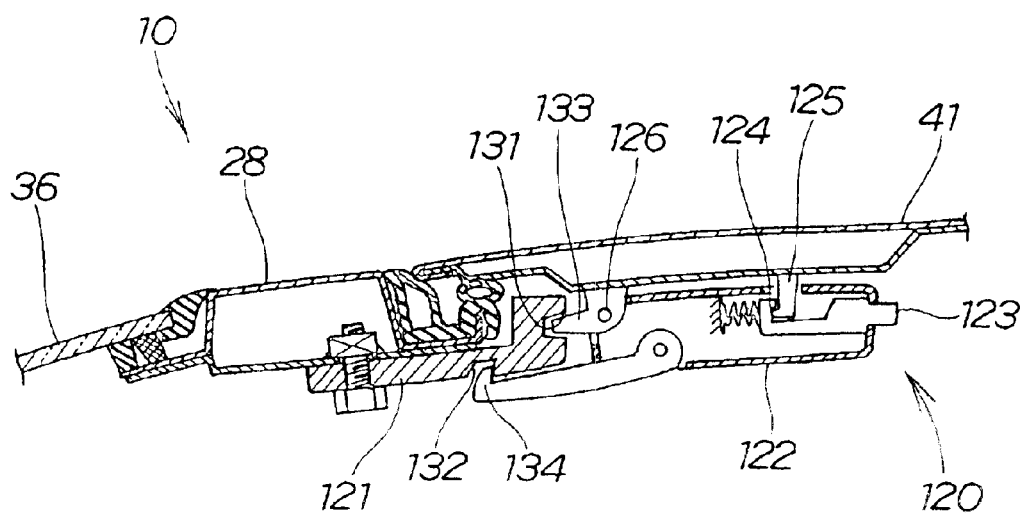
FIG. 10 is a cross-sectional view illustrating a locked state of a roof front rail and a front roof.

FIG. 10 is a cross-sectional view of the roof front rail 28, the front roof 41, and the surroundings according to the present invention, illustrating the connected state of the front roof 41 to the roof front rail 28.

The front roof 41 is locked by a roof lock mechanism 120 with its front edge portion superimposed on a rear upper portion of the roof front rail 28. The roof lock mechanism 120 is a manual lock mechanism including a lock board 121 mounted to an inside rear edge portion of the roof front rail 28 and a lock arm 122 mounted to an inside front edge portion of the roof 41.

Now, the operation of the roof lock mechanism 120 of the above structure will be described with reference to FIGS. 10 and 11. FIG. 10 illustrates that the roof lock mechanism 120 is in a locking state.

To unlock the roof lock mechanism 120, first, a push button (release button) 123 of the lock arm 122 is pressed to disengage a locking claw 124 of the push button 123 from a fixed claw 125. Then, the push button 123 is moved downward while being pushed to swing the lock arm 122 clockwise about a supporting pin 126 together with the push button 123. With this, locking claws 133, 134 are disengaged from locking grooves 131 and 132 in the lock board 121. The result is shown in FIG. 11.

Figure 11:
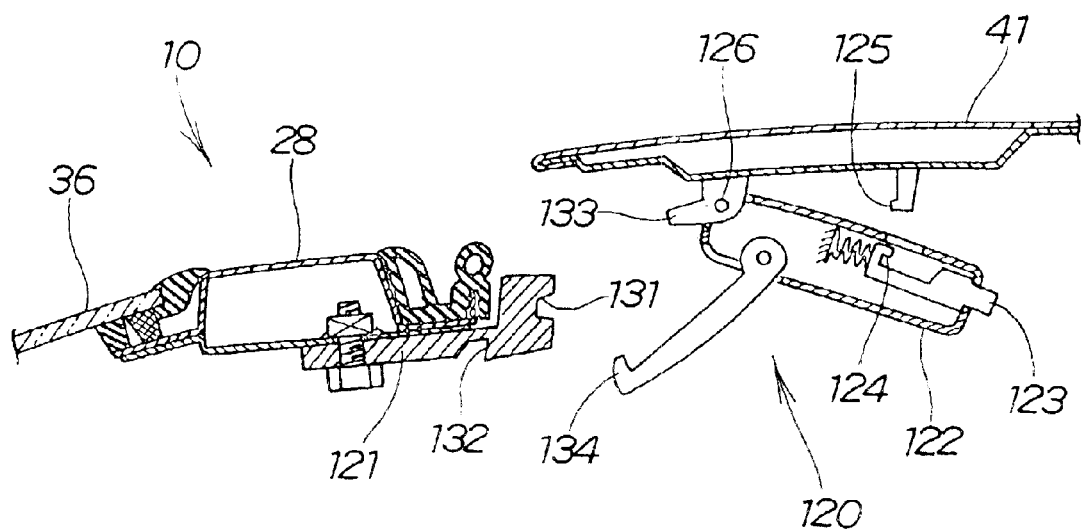
FIG. 11 is a cross-sectional view illustrating a roof lock mechanism disengaged from the state shown in FIG. 10.

FIG. 11 illustrates that the roof lock mechanism 120 is in an unlocking state. After this, the front roof 41 is moved upward to store the roof 40.

To lock the roof lock mechanism 120, the front edge portion of the front roof 41 is superimposed on the rear upper portion of the roof front rail 28, and the locking claws 133, 134 are engaged with the locking grooves 131, 132 in the lock board 121, and then the lock arm 122 is counter-clockwise swung to engage the locking claw 124 with the fixed claw 125.

Now, the operation of the entire open roof storage mechanism 50 will be described with reference to FIGS. 3, 4, 7, 9 and 12.

FIG. 3 illustrates that the top of the passenger compartment 11 is covered by the roof 40. The trunk lid 31 (see FIG. 1) is opened and a rod 82a of the cylinder 82 is extended, whereby to cause the link mechanism 60 to swing rearward, displacing the roof 40 rearward. As a result, the roof 40 is stored in the storage compartment 16 as shown in FIG. 4. At that time, as shown in FIG. 7, the striker 91 is fitted into the fitting groove 102 in the latch case 101. Then, as shown in FIG. 9, the latch 115 is engaged with the striker 91 to lock the link lock mechanism 90.

Figure 12:
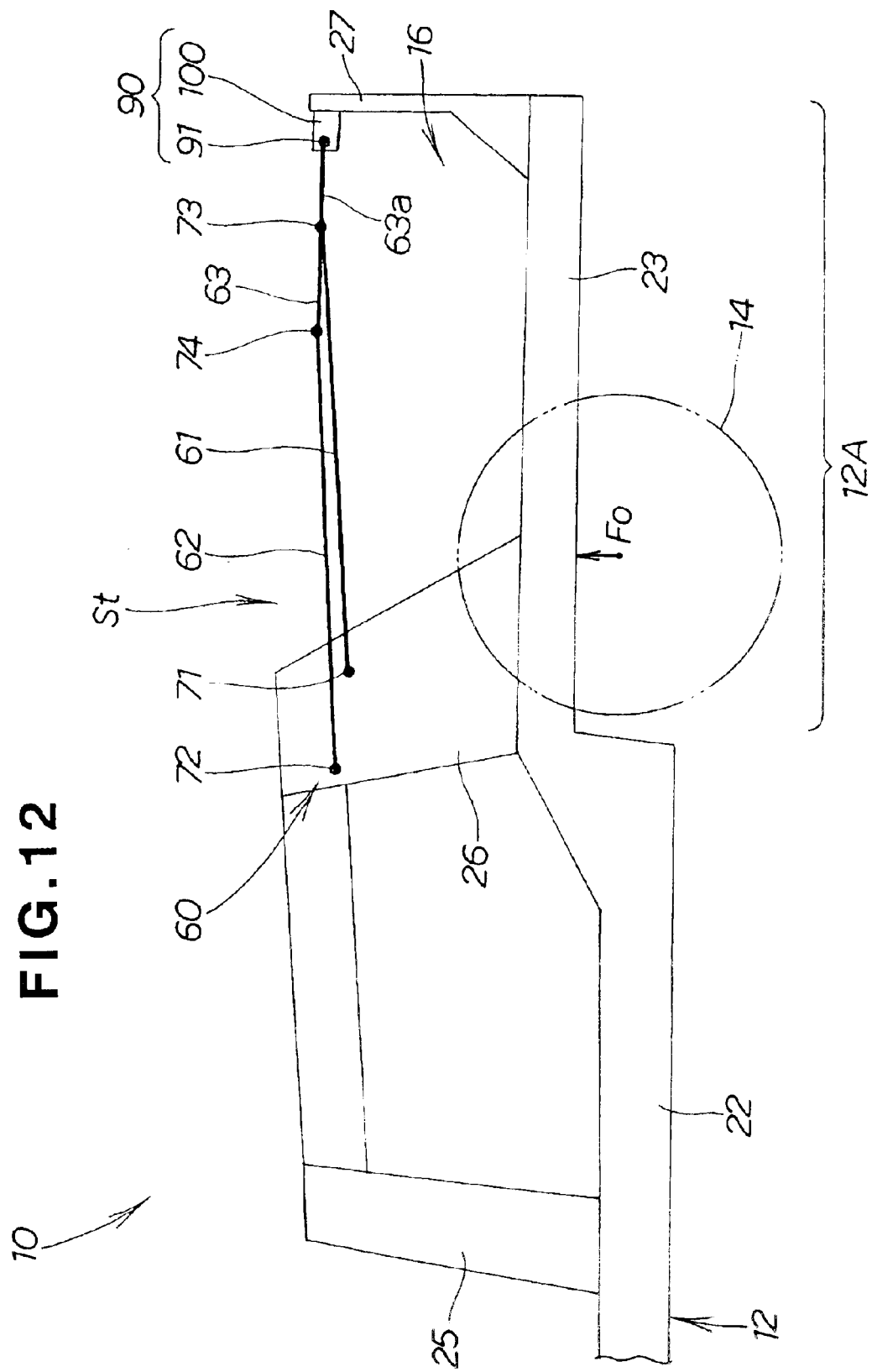
FIG. 12 is a schematic diagram of the open roof storage mechanism with the roof stored.

FIG. 12 schematically illustrates the link mechanism 60 and the link lock mechanism 90 in correspondence with those in FIG. 4. When the roof 40 (see FIG. 4) is stored in the storage compartment 16 and the link lock mechanism 90 is in the locked state, the link mechanism 60 and the link lock mechanism 90 are aligned in a generally horizontal straight line in a longitudinal direction of the vehicle body 12.

More specifically, as shown in FIG. 7, when the rear end portion 63a of the third link 63 is fastened to the rear end panel 27 by the link lock mechanism 90, the third link 63 extends longitudinally in a substantially horizontal state. With this state, as shown in FIG. 12, the first and second connecting pins 71, 72 are aligned substantially on an extension line of the third link 63, that is, aligned substantially horizontally at substantially the same level with the third link 63.

In other words, the first, second, third and fourth pins 71 to 74 and the striker 91 are longitudinally aligned in a substantially straight line when the vehicle body 12 is viewed from the side. Thus, the vehicle body 12 can be sufficiently supported by the link mechanism 60 between an upper portion of the rear pillar 26 and an upper portion of the rear end panel 27.

When a forward load acts on the rear end panel 27, for example, the forward load also acts on the rear pillar 26 through the latch case 101, the fitting groove 102, the striker 91, the third link 63, the third and fourth connecting pins 73, 74 shown in FIG. 7, and through the first and second links 61, 62 and the first and second connecting pins 71, 72 shown in FIG. 12.

When a rearward load acts on the rear pillar 26, the rearward load acts in the opposite direction to also act on the rear end panel 27.

In this manner, a longitudinal load acting on the rear pillar 26 or the rear end panel 27 can be supported by the rear end panel 27 or the rear pillar 26 via the link mechanism 60.

The vehicle 12, when viewed from the side as shown in FIG. 12, thus has a rear portion 12A of a substantially quadrilateral closed structure formed by the rear side frame 23, the rear pillar 26, the rear end panel 27, and the substantially horizontal link mechanism 60. As a result, the vehicle rear portion 12A can be increased in longitudinal rigidity. The ensured rigidity of the vehicle rear portion 12A can ensure a sufficient rigidity balance throughout the vehicle body 12.

During travel, a road reaction force Fo acts on the vehicle rear portion 12A via the rear wheel 14, for example, thereby causing a vertical bending moment or twisting moment in the vehicle body 12. Against such moment, the vehicle rear portion 12A has sufficient rigidity. This eliminates the need for reinforcement by reinforcing members to ensure the rigidity of the vehicle rear portion 12A. The vehicle body 12 can thus be prevented from weight increase.

As is clear from the above description, the open roof storage mechanism 50 is characterized by having the link lock mechanism 90 for fastening the swinging distal end portion 63a of the link mechanism 60 to the rear end portion of the vehicle body 12, that is, to the rear end panel 27 when the roof 40 is moved into the stored position St as shown in FIG. 4.

When the roof 40 is moved into the stored position St, the body 12 can be supported by the link mechanism 60 between (1) a portion to which swinging proximal portions of the link mechanism 60 are mounted, that is, the upper portion of the rear pillar 26 and (2) the rear end portion to which the swinging distal end portion 63a of the link mechanism 60 is fastened, that is, the upper edge portion of the rear end panel 27.

Here, the swinging proximal portions of the link mechanism 60 are portions of the first and second links 61, 62 mounted with the first and second connecting pins 71 and 72.

In this manner, the longitudinal rigidity of the vehicle rear portion 12A can be increased. The securement of rigidity of the vehicle rear portion 12A while preventing weight increase of the vehicle body 12 can thus ensure a sufficient rigidity balance throughout the vehicle body 12.

Further, as shown in FIG. 5, the provision of the left and right link mechanisms 60, 60 and the left and right link lock mechanisms 90, 90 permits the rear portion of the vehicle body 12 to be supported at its opposite sides by the left and right link mechanisms 60, 60. The longitudinal rigidity of the rear portion of the vehicle 12 can thus be further increased to ensure a more sufficient rigidity balance throughout the vehicle body 12.

Furthermore, the link lock mechanism 90 can have a simple structure comprised of the striker 91 provided at the swinging distal end portion 63a of the link mechanism 60 and the latch mechanism 100 provided at the rear end portion 27 of the vehicle body 12 for locking and unlocking the striker 91.

Now, a modification of the open roof storage mechanism 50 will be described with reference to FIGS. 13 to 15. Components identical to those in the embodiment shown in FIGS. 1 to 12 are given the same reference numerals and will not be described.

Figure 13:
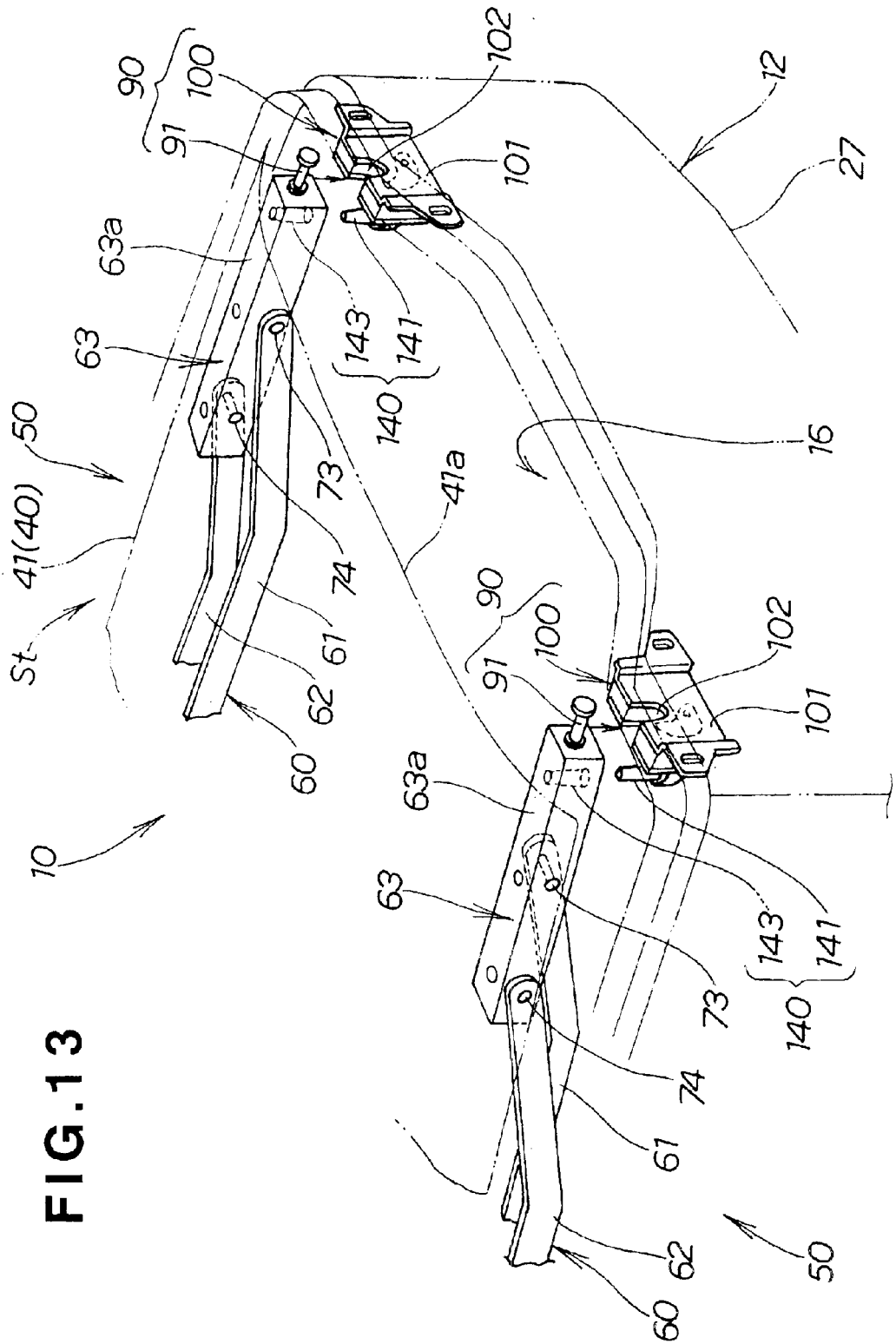
FIG. 13 is a perspective view illustrating a modification of the open roof storage mechanism according to the present invention.
Figure 14:
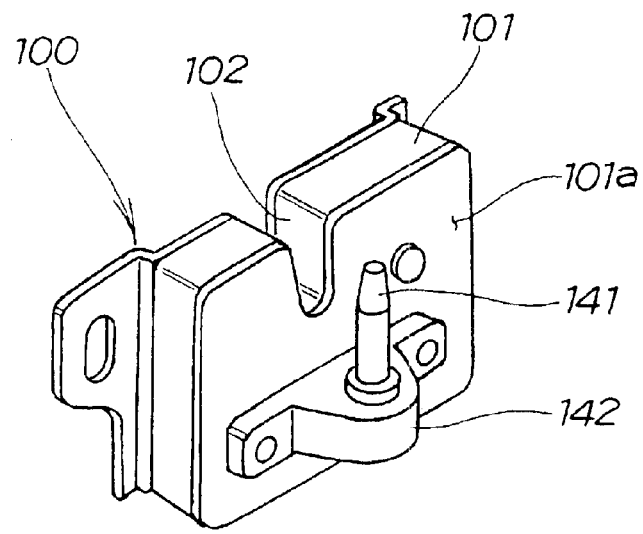
FIG. 14 is a perspective view illustrating a latch mechanism shown in FIG. 13.
Figure 15:
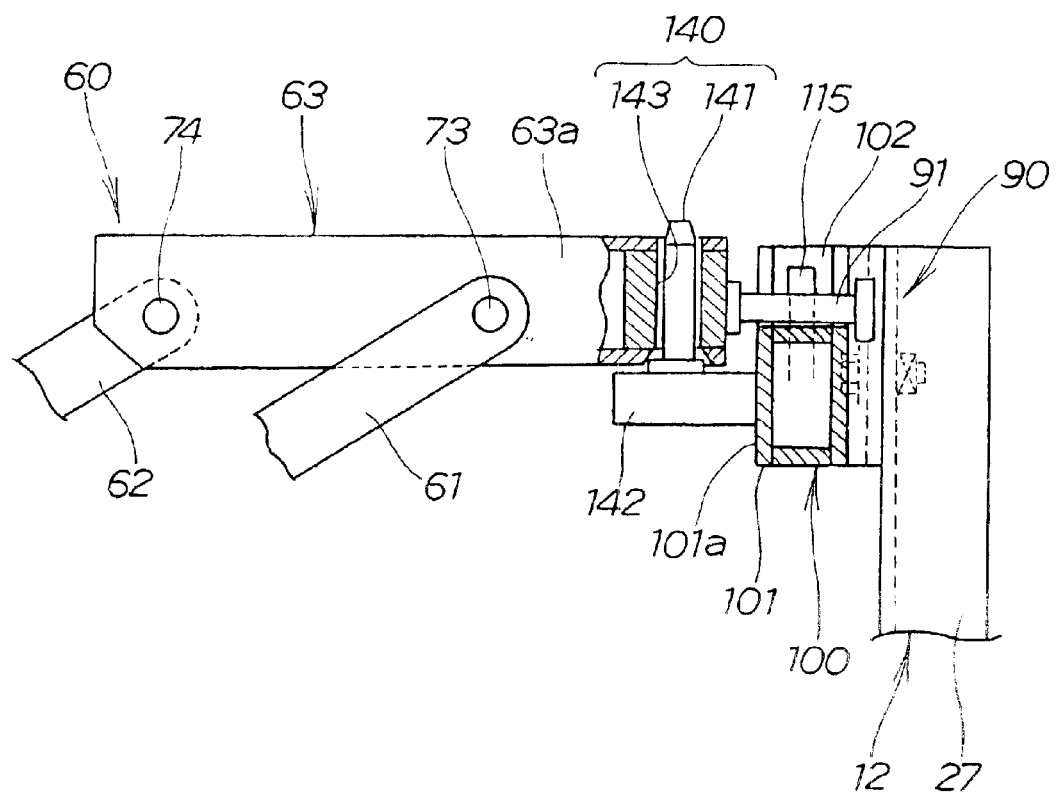
FIG. 15 is a side view illustrating a link lock mechanism shown in FIG. 13.
Figure 16:
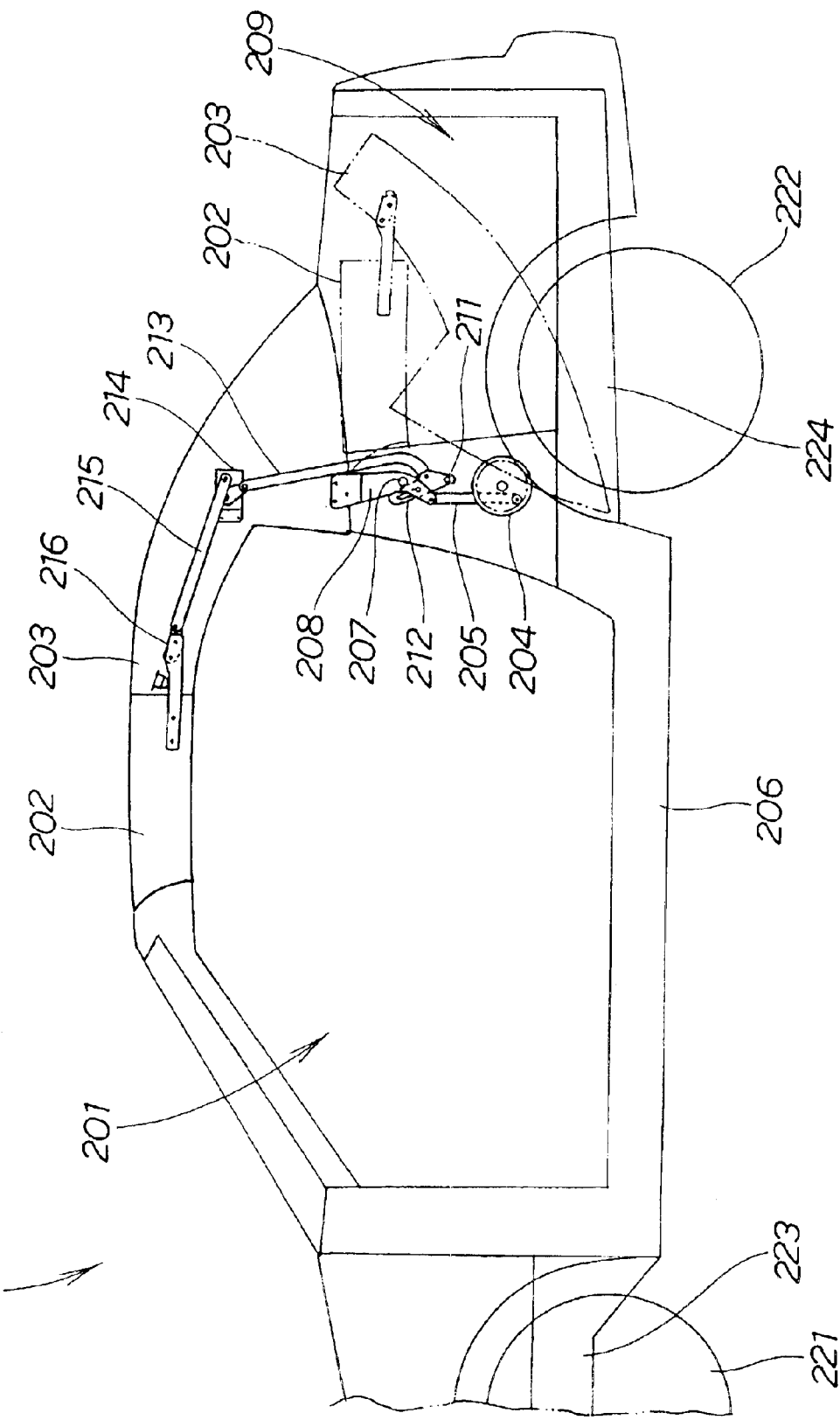
FIG. 16 is a schematic diagram of a conventional vehicle open roof apparatus.

Referring to FIGS. 13, 14 and 15, open roof storage mechanisms 50, 50 in the modification are characterized by that auxiliary lock mechanisms 140, 140 are provided to link lock mechanisms 90, 90. More specifically, a third link 63 of a link mechanism 60 is an elongated rectangular pipe, and a round-bar-shaped striker 91 is provided at the distal end of the rectangular pipe.

The link lock mechanism 90 has a latch mechanism 100 mounted to an upper edge portion of a rear end panel 27 for locking and unlocking the striker 91 which is configured to extend rearward of a vehicle body 12 from a swinging distal end portion 63a of the link mechanism 60 when a roof 40 is moved into a stored position St shown by imaginary lines in FIG. 13. A fitting groove 102 of the latch mechanism 100 in the modification extends therethrough in a longitudinal direction of the vehicle body 12.

The auxiliary lock mechanism 140 includes a vertically elongated lock pin 141 in a round-bar shape provided at a rear end portion of the vehicle body 12 (that is, a latch case 101), and a lock hole 143 provided in the swinging distal end portion 63a of the link mechanism 60 (a rear end portion 63a of the third link 63).

The lock hole 143 is a fitting hole vertically extending therethrough for vertically fitting onto the lock pin 141 when the roof 40 is moved into the stored position St. The lock hole 143 is a circular hole with a diameter slightly greater than the diameter of the lock pin 141.

The latch mechanism 100 thus has the same structure as in the embodiment shown in FIGS. 1 to 12 except that the lock pin 141 is mounted to a front surface 101a of the latch case 101 shown in FIG. 14 with a bracket 142, and will not be described.

Now, an open roof storage mechanism 50 in the above modification will be described.

When the roof 40 is moved into the stored position St shown by imaginary lines in FIG. 13, the striker 91 is fitted into the fitting groove 102 of the link lock mechanism 90, and at the same time, the lock pin 141 is also fitted into the lock hole 143. Then, the striker 91 is fastened to the latch mechanism 100.

Since the lock pin 141 is vertically fitted into the lock hole 143 when the roof 40 is moved into the stored position St, rattling of the lock pin 141 in the lock hole 143 in all horizontal directions can be prevented. This fact can further increase the longitudinal and lateral rigidity of the rear portion of the vehicle body 12, ensuring a more sufficient rigidity balance throughout the vehicle body 12.

The auxiliary lock mechanism 140 in the modification shown in FIGS. 13 to 15 may alternatively be comprised of a lock pin 141 provided at the swinging distal end portion 63a of the link mechanism 60 and a lock hole 143 provided in a rear end portion of the vehicle body 12.

Obviously, various minor changes and modifications of the present invention are possible in the light of the above teaching. It is therefore to be understood that within the scope of the appended claims the invention may be practiced otherwise than as specifically described.

What is claimed is:

1. A vehicle open roof apparatus which permits a roof covering a top of a passenger compartment to be stored in a storage compartment at a vehicle rear portion, the open roof apparatus comprising:

at least one link mechanism swingably mounted to a vehicle body of the vehicle to permit the roof to move between an extended position in which the roof is extended over the top of the vehicle and a stored position in which the roof is stored in the storage compartment; and at least one link lock mechanism for fastening a swinging distal end portion of the link mechanism to a rear end portion of the vehicle body when the roof is moved into the stored position; wherein the one link lock mechanism has an auxiliary lock mechanism, the auxiliary lock mechanism comprising a vertically elongated lock pin provided at one of the rear end portion of the vehicle body and a swinging distal end portion of the one link mechanism, and a lock hole provided in the other of the swinging distal end portion of the one link mechanism and the rear end portion of the vehicle body, such that the lock pin can be vertically fitted in the lock hole.

* * * * *